Dec. 1, 1970     C. L. MEEHAN     3,543,353

WIRE TIE

Filed Aug. 16, 1966

INVENTOR.
Clarence L. Meehan
BY

His Att'ys

United States Patent Office 3,543,353
Patented Dec. 1, 1970

3,543,353
WIRE TIE
Clarence L. Meehan, Itasca, Ill., assignor to Illinois Tool Works Inc., Chicago, Ill., a corporation of Delaware
Filed Aug. 16, 1966, Ser. No. 572,770
Int. Cl. B65d 63/00
U.S. Cl. 24—16                        8 Claims This invention relates to a flexible plastic fastener for securing two or more elongated workpieces in a bundle, or more specifically, for maintaining two workpieces in side-by-side parallel axis relationship.

More particularly, the embodiment of the present invention is adapted for use as a wire tie, but can be used with equal facility for retaining strings of Christmas tree lights to tree limbs, plants to stakes and any other application requiring a simple means for expeditiously bundling two or more members together.

An object of this invention is to provide a fastener device which due to its simplicity provides ease in operation and application.

A further object of the invention is to provide a removable positive locking means which is economical to fabricate.

Other objects will become apparent to those skilled in the art when the specification is read in conjunction with the accompanying drawing wherein similar parts are designated by similar numerals.

Figure 1:
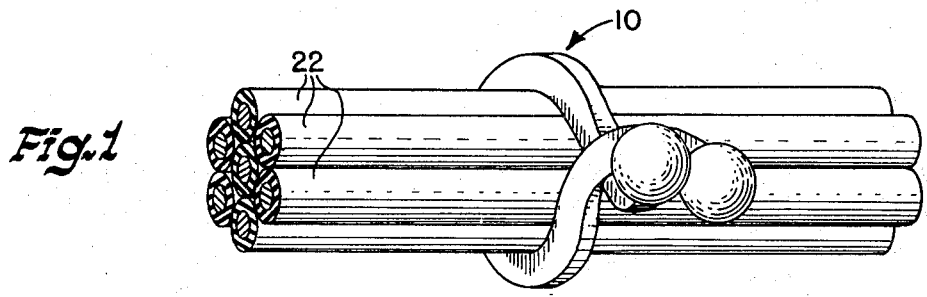
FIG. 1 is a perspective view of a fastener embodying the principles of this invention as shown in applied position securing a plurality of elongated workpieces, i.e., a bundle of wires, in associated relationship.

A preferred embodiment of the invention is illustrated by the fastener 10 embodying the principles of this invention and including a relatively resilient spring-like loop-shaped body 12. Body 12 preferably is a segment of a circular arc extending for more than 270°. Additionally, it has been found that the body and other portions operate best when they are non-circular in cross section, for reasons set forth hereinafter.

Extending integrally from the free ends of body 12 are end portions 14 lying substantially in the same plane as body 12 and extending first inwardly toward one another and then curving outwardly. In the embodiment shown the end portions 14–16 have the same cross-sectional configuration of body portion 12. Thus, end portions 14–16 are each convex toward one another and provide a concavity on their opposite sides opening outwardly away from one another and forming oppositely facing hook-like segments. The convex sides of end portions 14 and 16 form a throat 17 for purposes best set forth hereinafter.

At the free extremity of end portions 14–16 there are preferably provided a pair of laterally enlarged protuberances 18–20, respectively, having curvilinear surfaces and, as shown in the preferred embodiment, can be substantially spherical. It should be noted, however, that other surface form such as ellipsoids, oblate spheroids, or prisms will operate satisfactorily.

The wire tie or fastener 10 in question can be injection molded using a resilient plastic material such as nylon or polyethylene and preferably has the body portion 12, end portions 14–16, and protuberances 18–20 symmetrical about a common plane. The choice of materials and shape of the cross-sectional configuration must provide a generalized rigidity to the fastener while at the same time providing a tough resiliency to the spring-like body portion 12. Other types of plastic materials will be apparent to those skilled in the art.

Figure 2:
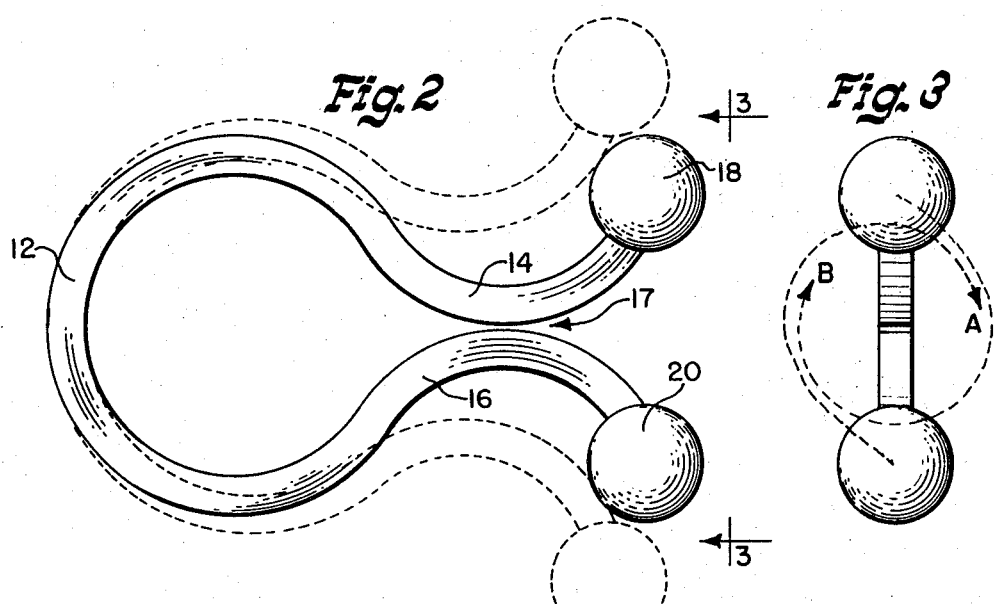
FIG. 2 is an elevational view of a fastener of the type shown in FIG. 1 without the bundle of wires and shown in its initial or unstressed condition.
Figure 3:
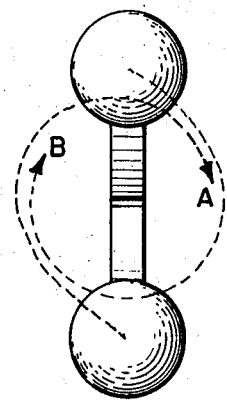
FIG. 3 is an end view of the fastener shown in FIG. 2 as taken along lines 3—3.
Figure 4:
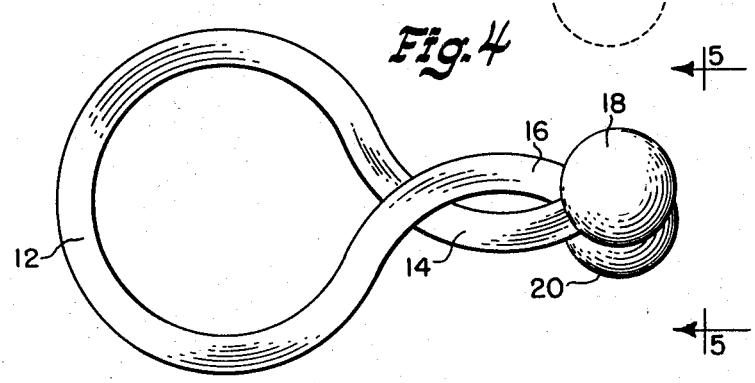
FIG. 4 is an elevational view showing the fastener embodying the teachings of this invention in its stressed or locked position.
Figure 5:
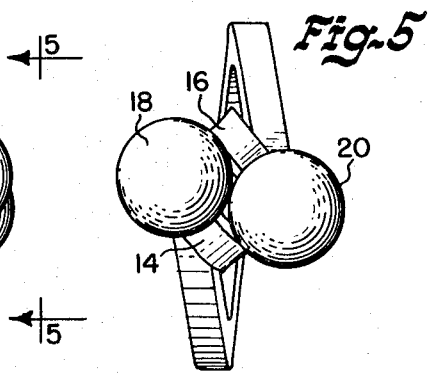
FIG. 5 is an end view taken along lines 5—5 of FIG. 4.

In the operation of the fastener a plurality of workpieces 22 are gathered into subsantially parallel longitudinal relationship and introduced by moving them transverse to their axes through throat 17 into the interior of body portion 12. The convex faces of end portions 14 and 16 are spread, by stressing the spring-like body portion, as illustrated in the phantom position shown by the dotted lines in FIG. 2, until the workpieces are positioned within the interior of the loop of the body portion 12. The resilient spring-like qualities of body 12 will close throat 17 after introduction of the workpieces and retain them temporarily. By application of finger pressure on the protuberances 18–20 the end portions are moved laterally and thence toward one another in a rotating or twisting motion to bring their concave or hook-like segments into opposed relationship, as shown in FIGS. 1, 4 and 5. The movement or path of the protuberances during this operation is best seen by the dotted arrow paths "A" and "B" in FIG. 3, although it should be noted that movement in the opposite hand or counterclockwise to that illustrated is equally acceptable. When the end portions 14–16 are hooked together the protuberances or balls 18–20 are brought into an over-center relationship as shown in FIG. 5. The device will remain hooked together in latched position without the aid of the balls 18–20 due to the non-circular cross section of the body and end portions which provide a biting point contact where the hook-like segments contact each other in locked position and the aggressive urging of the hook-like portions into engagement by the spring-like qualities of the body portion 12. The presence of the over-center balls 18–20 provides an additional locking effect.

The preferred curved surface of the protuberances 18–20 prevent irritation and chafing of operators hands. Additionally, the protuberances can be inserted in apertured or slotted panels for retention of the bundle in mounted relation to a panel, this latter arrangement not being shown in the drawings.

While only one embodiment of the present invention has been illustrated and described other embodiments will become apparent to those skilled in the art and it is my intention that I be limited only by the appended claims.

I claim:

1. A one piece flexible fastener adapted to embrace two or more axially aligned workpieces including a resilient ring-like loop shaped body portion adapted to substantially encircle said workpieces, integral curved end portion extending from opposite sides of said loop shaped body portions inwardly towards one another and thence outwardly so that the free ends extend in opposite directions toward the sides of said body portions forming a pair of oppositely facing hook-like members, said hook-like members being adapted to be moved into a closed hooked relationship, said hook-like members being non-circular in cross-section and each presenting means defining an edge for bitingly engaging the other hook-like member, said spring-like body portion resiliently maintaining said hook-like members in removably locked relationship.

2. A device of the type claimed in claim 1 wherein said body and end portions initially lie substantially in a common plane.

3. A device of the type claimed in claim 2 wherein a laterally enlarged protuberance is positioned on each of said free ends in initially spaced relations to one another whereby when said end portions are moved into opposed hooked relationship said protuberances engage each other in an over center position.

4. A device of the type claimed in claim 3 wherein said body portion presents a continuous loop configuration forming a segment of a circle and is adapted to internally accept a complementary work part, said end portions which extend from each end of said body each being curvilinear with the concave sides thereof initially facing outwardly in opposite directions forming a pair of hooks, the convex sides of said end portions facing inwardly in opposition to one another and forming a reduced flexibly enlargeable entrance to the interior of said body portion adapted to be moved laterally to accept said workpieces, whereby when said end portions are twisted said concave portions are brought into hooked relationship with said protuberances on the free ends thereof positioned on opposite sides of said common plane and said reduced entrance being closed by said hooked end portions to prevent egress of said workpieces through said entrance.

5. A device of the type claimed in claim 1 wherein said body and end portions are of substantially uniform non-circular cross section throughout their extent.

6. A device of the type claimed in claim 5 wherein said body and end portions are square in cross section and said protuberance means are substantially spherical.

7. A device of the type claimed in claim 1 wherein said body portion forms an annular loop in excess of 270° encompassment.

8. A flexible fastener comprising a resilient ring-like loop shaped body portion having integral curved end portions extending from opposite sides of said loop shaped body portion inwardly towards one another and thence outwardly so that the free ends extend in opposite directions toward the sides of said body portions forming a pair of oppositely facing hook-like members, said hook-like members being adapted to be moved into a closed hooked relationship, said hook-like members being non-circular in cross-section and each presenting means defining an edge for bitingly engaging the other hook-like member, said spring-like body portion resiliently maintaining said hook-like members in removably locked relationship.

References Cited

UNITED STATES PATENTS

| 160,972 | 3/1875 | Travis | 24—16 |
| 548,947 | 10/1895 | Andal | 24—30.5 |
| 3,078,533 | 2/1963 | Allen | 24—30.5 |
| 3,197,829 | 8/1965 | Caveney et al. | 24—16 |

FOREIGN PATENTS

| 71,161 | 3/1959 | France. |
| 10,074 | 1902 | Great Britain. |
| 146,202 | 6/1931 | Switzerland. |

DONALD A. GRIFFIN, Primary Examiner